United States Patent

[11] 3,615,734

[72] Inventor George Rolland Cole
   Wilmington, Del.
[21] Appl. No. 772,853
[22] Filed Nov. 1, 1968
[45] Patented Oct. 26, 1971
[73] Assignee E. I. du Pont De Nemours and Company
   Wilmington, Del.

[54] BRAZEABLE COMPOSITIONS
   6 Claims, No Drawings
[52] U.S. Cl....................................... 106/1,
   117/123, 117/227, 252/514
[51] Int. Cl....................................... C09d 5/24
[50] Field of Search........................................... 106/1;
   252/514; 117/123 B, 227

[56] References Cited
   UNITED STATES PATENTS
   3,407,081 10/1968 Ballard......................... 106/1
   3,502,489 3/1970 Cole............................. 106/1

Primary Examiner—Lorenzo B. Hayes
Attorney—John J. Klocko, III

ABSTRACT: The brazeable compositions for metallizing ceramic bodies comprising noble metals and a low-alkali aluminosilicate glass, wherein said glass consists essentially of $SiO_2$, $Al_2O_3$, MgO, CaO and $Na_2O$. Optional amounts of BaO, $B_2O_3$ and $K_2O$ may also be included in the glass compositions. Critical proportionate amounts of metal: glass and the various oxides are required. These brazeable metallizing compositions can be fired in air, at temperatures of at least 900° C. and yet be brazeable without the need for electroplating; the fired brating compositions are able to withstand reducing atmospheres of a brazing furnace and also compatible with conventional brazing alloys (e.g., Ag-Cu).

BRAZEABLE COMPOSITIONS

BACKGROUND OF THE INVENTION

In the past it has been difficult to join ceramic materials together or to metal because it has been difficult to find a bonding material which adheres closely enough to the surface of the ceramic to provide a tight joint, particularly a joint sufficiently tight to withstand a vacuum. Many attempts have been made to use ceramics for these purposes, but lack of a satisfactory bonding method has prevented a large scale application to such devices as hermetically sealed envelopes for electrical apparatus. According to standard practice ceramic-to-metal seals can be classified into two groups, depending on whether soft solder or braze (also called "hard" solder) is employed. Soft soldered ceramic-to-metal joints are used in apparatus which is not heated strongly either in manufacture or service, such as terminals for radio components, capacitors, and so forth. The ceramic part is metallized and then joined to the metal with tin-lead solder of melting point in the range of 183° C. to 312° C. The brazed, or hard soldered, joints are used in apparatus that must withstand moderately high temperature at some stage of its manufacture. The braze metal is usually a silver-base alloy typically melting in the range 600° C. to 960° C. The metallizing coating of the ceramic must adhere during the high temperature brazing operation and not be fractured by thermal stresses on cooling.

Very special metallizations are called for in the case of the brazed joints, and the conditions become extremely rigorous in the electronic industry. Many electronics applications require brazed joint connections to alumina or beryllia that can withstand subsequent device attachment operations at 375° C. to 425° C. and soft solder reflow at about 220° C. Where high temperature brazing commonly requires a strong corrosive flux to clean the surfaces to be brazed and help the brazing alloy to flow properly, in electronics applications the corrosive flux is dispensed with to avoid corrosive residues. In lieu of flux the operation is performed in a reducing atmosphere furnace. The reducing atmosphere removes tarnishes and surface oxides and also promotes wetting of the metal and metallized ceramic by the brazing alloy.

Very few metallizing systems provide the needed combination of (1) resistance to reducing atmosphere at 600° C. to 960° C., (2) compatibility with the commonly used silver-copper eutectic (72% Ag, 28% Cu) alloy braze (M.P.=780° C.), and (3) good strength of the resulting ceramic-to-metal joint. The known systems depend on refractory metal films which must be fired onto the ceramics in reducing atmosphere at very high temperatures.

A system widely used in the electronics industry employs the refractory metal molybdenum with an additive of manganese or other refractory metal or oxide, such as disclosed in U.S. Pat. Nos. 2,667,432, 2,667,427 and 3,023,492. This refractory metal system fired on the alumina ceramic body in a reducing, i.e., hydrogen atmosphere at approximately 1400° to 1500° C., and a strong bond is formed between the molybdenum-manganese film and the alumina. A layer of nickel metal is next electroplated over the molymanganese, and copper or gold is frequently electroplated over it. These additional plated layers greatly facilitate the next step, which is joining to the desired metal parts by means of silver-copper brazing alloy. When small, separated areas of metallization are required, the electroplating step is followed by a photoetching or mechanical grinding step to give the final electrical separation. The brazing operation is performed in a reducing atmosphere furnace to prevent oxidation of the metal parts and to promote flow of the molten brazing alloy (MP=780° C.) over the areas to be joined.

This system is almost universally used in spite of its complexity because it is at present the best way of making good brazed joints of ceramic to metal. To recapitulate the steps are:

1. Screen print Mo/Mn on the alumina.
2. Fire at high temperatures (e.g., 1400° C. to 1500° C.) in hydrogen atmosphere.
3. Electroplate with nickel.
4. Electroplate with gold (optional in some cases).
5. Etch or grind away unwanted areas that were needed in steps 3 and 4.
6. Braze with Ag-Cu alloy (MP=780° C.) in hydrogen.

It is the purpose of this invention to provide an improved brazing metallization and method of metallizing a ceramic which permit silver/copper alloy brazing in hydrogen but which are much simpler in application than the above-described Mo/Mn type brazing.

SUMMARY OF THE INVENTION

This invention relates to brazeable metallizing compositions which possess one or more of the following improvements: (a) brazeable metallizations which can be fired at low temperatures (e.g., below 1400° C.); (b) metallizations which can be fired in ordinary atmospheres rather than in a nonoxidizing atmosphere; (c) improved metallizations which will themselves be brazeable and thus will eliminate the steps of electroplating and subsequent grinding or etching. In accordance therewith, the brazeable metallizing compositions of this invention comprise 90–99% noble metal(s) and 1–10% of a low-alkali, aluminosilicate glass, said glass consisting essentially of 45–65% $SiO_2$, 10–25% $Al_2O_3$, 5–15% MgO, 2–12% CaO, 0.5–4% $Na_2O$, 0–5% BaO, 0–5% $B_2O_3$ and 0–4% $K_2O$.

In addition, the invention relates to methods of providing strongly adherent electrically conductive metallic coatings on ceramic surfaces by applying the above-described brazeable compositions and firing the same. The ultimate metallized ceramic structures are also part of this invention.

DESCRIPTION OF THE PREFERRED EMBODIMENTS

The preferred brazeable compositions for metallizing comprise 90–99% noble metal(s) wherein said noble metal contains at least 50% platinum having a surface area within the range of 0.05–5 m.$^2$/g., and 1–10% of finely divided low-alkali aluminosilicate glass, said glass consisting essentially of 45–65% $SiO_2$, 10–25% $Al_2O_3$, 5–15% MgO, 2–12% Cao, 0.5–4% $Na_2O$, 0–5% BaO, 0–5% $B_2O_3$ and 0–4% $K_2O$.

The basic elements of the invention comprise one or more noble metals, or alloys thereof, and a glass frit that can be fired onto a ceramic substrate in air. In addition, the noble metals and glass frit must be able to adhere strongly to each other and to the ceramic substrate in both oxidizing and reducing atmospheres (e.g., air and hydrogen firing). Also, the composite metallizing film must be wettable by conventional brazing alloys (e.g., Ag/Cu alloy) but not dissolved by them in order to function as a brazeable coating.

The metals which can be used in the brazeable compositions of this invention are limited to noble metals. These metals are not destructively oxidized by high temperature in air. The metals must be wet, but not attached too vigorously, by the molten brazing alloy. The list of metals includes platinum, palladium, gold, silver, rhodium, ruthenium, osmium, iridium, mixtures thereof and alloys thereof. A preferred metal is degassed platinum as described in commonly assigned Ser. No. 716,357, filed Mar. 27, 1968 now U.S. Pat. No. 3,511,640 issued to D. G. Kelemen on May 12, 1970; other operable metals include coarse platinum, as described in Ser. No. 756,358, filed Aug. 30, 1968, now abandoned (O. A. Short), or nitrogen-free platinum as described in Ser. No. 756,394, filed Aug. 30, 1968, (O. A. Short), each of which was commonly assigned with the present application to E. I. du Pont de Nemours & Company.

The glass must be one possessing a high softening point, necessarily no lower than the brazing temperature but no higher than the melting point of the admixed metals. Also, the glass must possess a low to medium thermoexpansion coefficient to be compatible with ceramic substrates. When in molten form, the glass must wet the ceramic surface and the admixed noble metals. Significant amounts of heavy metal oxides must not be present in the glass because such oxides are prone to be reduced in hydrogen and cause the glass to lose its adhesive and cohesive properties. The glasses which have been found to fulfill these purposes are low-alkali, aluminosilicate glasses consisting essentially of 45–65% $SiO_2$, 10–25% $Al_2O_3$, 5–15% MgO, 2–12% CaO, 0.5–4% $Na_2O$, 0–5% BaO, 0–5% $B_2O_3$ and 0–4% $K_2O$. Other glasses, such as the typical metal-sealing borosilicates, do not produce the desired results but yield metallizations which lose adhesion during brazing.

The process of this invention, which involves providing a strongly adhesive, electrically conductive, brazeable metallic coating on a ceramic substrate, has two alternative embodiments. In one case, the noble metals and glass are admixed together in proper proportions with a viscous binder, applied as a coating on a ceramic substrate, and fired to produce an adherent metallization. The proper balance of glass to metal is critical to this invention. If the glass content is too low (i.e., less than 1%), adhesion will be poor; if the glass content is too high (i.e., more than 10%), the molten brazing alloy will not properly wet the surface of the metallization. In the alternative method, a layer of the glass, made into a suitable paste with a viscous binder, is applied first. Then a layer of the noble metals and glass is applied over the top of the initial glass layer. The glass layer and the glass/noble metal layers may be fired consecutively or concurrently.

Thus, the porportions of metal:glass are critical to this invention. In general, 1–10% by weight of glass is mixed with 90–99% by weight of noble metal(s). However, if a glass layer is laid down on the ceramic prior to applying the brazing composition, no glass is necessary in the brazeable composition; this is still within the scope of this invention. It is, however, preferred to include glass in the brazeable composition even if a glass layer is applied prior to metallization. A preferred metal:glass range is 1–6% glass and 94–99% noble metal(s).

The invention is illustrated by the following examples. In the examples and elsewhere in the specification, all parts, ratios and percentages of materials or components are by weight.

The glass composition utilized in the examples was produced by melting a batch composition yielding the prescribed metal oxides and porportions thereof. The batch constituents, consisting of: 57 g. $SiO_2$, 1.71 g. $Na_2CO_3$, 5.5. g. CaO, 12 g. MgO, 7.12 g. $H_3BO_3$ and 20.5 g. $Al_2O_3$ were blended and placed in a crucible. The batch was heated to 1640° C. to yield a substantially homogeneously fluid glass. The molten glass was fritted by pouring into water. The frit was then ball milled for 16 hours, filtered and dried. This yielded a glass containing 57% $SiO_2$, 1% $NaO_2$, 5.5.% CaO, 12% MgO, 4% $B_2O_3$ and 20.5% $Al_2O_3$.

A coarse platinum powder (1–2 microns) was degassed as described in copending Ser. No. 716,357, filed Mar. 27, 1968. This degassed platinum powder, which had a surface area of approximately 0.2 m.²/g., is used in the examples.

Several pastes were prepared by blending the following ingredients:

Paste A

| | |
|---|---|
| Degassed Pt (described above) | 95% |
| Vehicle I (30% hydrogenated rosin, 48% kerosene 16% aromatic naphtha, 6% ethyl cellulose) % | 5% |

Paste B

| | |
|---|---|
| Glass Frit (described above) | 65% |
| Vehicle II (10% ethyl cellulose, 90% B-terpineol) | 35% |

Paste C

| | |
|---|---|
| Degassed Pt | 85% |
| Glass Frit | 5% |
| Vehicle I | 10% |

Paste D

| | |
|---|---|
| Degassed Pt | 87.2% |
| Glass Frit | 5.1% |
| Vehicle I | 7.7% |

Paste E

| | |
|---|---|
| Degassed Pt | 88.5% |
| Glass Frit | 1.5 % |
| Vehicle II | 10.0% |

Paste F

| | |
|---|---|
| Degassed Alloy (50% Pt, 25% Pd, 25% Au) | 87% |
| Glass Frit | 3% |
| Vehicle II | 10% |

EXAMPLE 1

Glass frit paste B was screen printed (200 mesh screen) onto an alumina substrate (94% alumina) 1 inch square and 0.025 inches thick, dried at 110° C. for 10 minutes, and fired 4 minutes in air at 1250° C. Platinum paste A was screen printed (200 mesh screen) over the prefired glassy layer, dried 10 minutes at 110° C., and fired 4 minutes in air at 1250° C. The fired prints were a four by four array of 0.1 inch squares on the alumina substrates.

Kovar metal (Fe-Ni-Co alloy) strips 0.016 inches wide were brazed to the metallized alumina. The brazing filler metal was the conventional 72% Ag-28% Cu eutectic alloy. The parts were assembled with foil preforms of the brazing alloy and inserted into a hydrogen atmosphere furnace at 830° C. for 2 minutes and 15 seconds. Then the adhesion strength of the brazing was tested by bending up the strips at right angles to the plane of metallization and peeling them loose with a Chatillon strength tester. Failure of the bond was at the metal-to-glass interface, with local conchoidal fracture of the glassy layer. The strength was considered to be good with an average peel strength of 1.2 pounds being recorded.

EXAMPLE 2

Glass frit paste B was screen printed (200 mesh) onto an alumina substrate (96% alumina) 1 inch square and 0.025 inches thick, and dried at 110° C.; this glass was not fired. The platinum-glass paste C was screen printed (200 mesh) over the glassy layer and dried 10 minutes at 110° C. Then both layers were fired together in air at 1250° C. for 4 minutes. The prints were a four by four array of 0.1 inch squares.

Kovar metal strips were brazed to the metallized alumina as described in example 1 and the adhesion test was performed. Excellent adhesion strength of 1.9 pounds was exhibited.

EXAMPLE 3

The process of example 2 was carried out except that the glassy layer was double printed. One layer of glass was printed and dried and then another layer was printed on top of that and dried. Finally, the platinum-glass paste was printed on top and all layers were fired together. The adhesion strength was 2.0 pounds.

Examples 4–7 are carried out by procedures in accordance with examples 1–3. The additional examples are presented in table I with the appropriate procedure designated and deviations specifically stated.

TABLE I

| Ex. | Brazeable composition | Underlying glass layer | Printing sequence | Firing conditions | Adhesion strength (lbs.) |
|---|---|---|---|---|---|
| 4 | Paste D | None | As Example 2 | 1,250° C.—4 min | 1.3 |
|   | do | Paste B | do | 1,250° C.—4 min | 1.95 |
| 5 | Paste E | do | As Example 1 | 1,250° C.—4 min | 1.9 |
| 6 | Paste E | do | As Example 2 | 950° C.—10 min | 1.2 |
|   | do | do | do | 1,000° C.—10 min | 1.8 |
|   | do | do | do | 1,100° C.—6 min | 2.2 |
| 7 | Paste F | do | do | 1,200° C.—6 min | 1.3 |

EXAMPLE 8

Glass frit paste B was screen printed onto an alumina substrate and dried at 110° C. for 10 minutes. A platinum paste comprising 87% degassed platinum, 3% of the previously described glass frit and 10% of vehicle II, was screen printed over the glass layer and dried for 15 minutes at 300° C. The printed pattern consisted of a double row of rectangles 0.025 inches wide and 0.040 inches long. Then the entire assembly was fired in hydrogen at 110° C. for 15 minutes; in addition, some of the assemblies were fired in air at 1020° C. for 15 minutes.

The adhesion values of the hydrogen fired sample were reported as 0.6 pounds while the air firing adhesion values were 0.5 pounds. These adhesion strengths are considered to be good but are not directly comparable to the previous examples because of the differences in the size of the metallized pads. This clearly demonstrates that the brazeable compositions of this invention can be fired both in hydrogen and in air and produce comparable results.

The brazeable compositions of this invention will usually, although not necessarily, be dispersed in an inert liquid vehicle to form a paint or paste for application to ceramic substrates. The proportion of vehicle to solids may vary considerably depending upon the manner in which the paint or paste is to be applied and the kind of vehicle used. Generally, 1–96% by weight of solids (metals and glass) and 4–99% by weight of vehicle will be used to produce a paint or paste having the desired consistency.

Any liquid, preferably one that is inert towards the metal powder, may be employed as the vehicle. Water or any of various organic liquids, with or without resin binders, thickening and/or stabilizing agents, and/or other common additives may be utilized as the vehicle. Examples or organic liquids that can be used as the vehicle are the higher alcohols, esters of alcohols, for example, the acetates and propionates; the terpenes such as pine oil, alpha- and beta-terpineol and the like; and solutions of resin binders such as the polymethacrylates of lower alcohols, or solutions of ethyl cellulose, and solvents such as pine oil and the monobutyl ether of ethylene glycol monoacetate (butyl-O-$CH_2CH_2$-$OOCH_3$). A preferred vehicle for use in this invention consists of: hydrogenated rosin, ethyl cellulose, highflash naphtha and kerosene. Such vehicles are disclosed in commonly assigned copending application Ser. No. 617,855, filed Feb. 28, 1967, now abandoned (O. A. Short). Also, any of the other vehicles disclosed in that application may be used. The vehicle may contain or be composed of volatile liquids to promote fast setting after applications; or it may contain waxes, thermoplastic resins or the like materials which are thermofluid so that the vehicle-containing composition may be applied at an elevated temperature to a relatively cold ceramic body upon which the composition sets immediately.

I claim:

1. A brazeable composition for metallizing ceramic bodies comprising 90–99% noble metals(s) and 1–10% of a low-alkali, aluminosilicate glass; said noble metal(s) being selected from the group consisting of platinum, palladium, gold, silver, rhodium, ruthenium, osmium, iridium, mixtures thereof and alloys thereof; and said glass consisting essentially of 45–65% $SiO_2$, 10–25% $Al_2O_3$, 5–15% MgO, 2–12% CaO, 0.5–4% $Na_2O$, 0–5% BaO, 0–5% $B_2O_3$ and 0–4% $K_2O$.

2. A brazeable composition in accordance with claim 1 which is dispersed in an inert liquid vehicle.

3. A brazeable composition in accordance with claim 1 wherein the glass consists essentially of, in weight percent, approximately 57% $SiO_2$, 20.5% $Al_2O_3$, 12% MgO, 5.5% CaO, 4% $B_2O_3$ and 1% $Na_2O$.

4. A brazeable composition in accordance with claim 1 wherein said noble metal contains at least 50% platinum having a surface area within the range of 0.05–5 m.²/g., and wherein said low-alkali aluminosilicate glass is in finely divided form.

5. A brazeable composition in accordance with claim 4 which is dispersed in an inert liquid vehicle.

6. A brazeable composition in accordance with claim 4 wherein the noble metal is degassed platinum.

* * * * *